United States Patent

Dall' Asta

[11] Patent Number: 5,815,672
[45] Date of Patent: Sep. 29, 1998

[54] APPARATUS FOR EXCHANGING INFORMATION BETWEEN INTEGRATED CIRCUIT IDENTIFICATION CARDS AND A TERMINAL DEVICE

[75] Inventor: Alberto Dall' Asta, Pavia, Italy

[73] Assignee: Alcatel N.V., Rijswijk, Netherlands

[21] Appl. No.: 686,665

[22] Filed: Jul. 26, 1996

[30] Foreign Application Priority Data

Jul. 28, 1995 [IT] Italy .................................. MI95A1664

[51] Int. Cl.⁶ .................................................. G06F 13/00
[52] U.S. Cl. ................................................................. 395/282
[58] Field of Search ................................ 395/282, 821; 235/380

[56] References Cited

U.S. PATENT DOCUMENTS

| | | | |
|---|---|---|---|
| 4,556,958 | 12/1985 | Ugon | 395/821 |
| 4,888,773 | 12/1989 | Arlington et al. | 371/40.2 |
| 5,149,945 | 9/1992 | Johnson et al. | 235/380 |
| 5,202,852 | 4/1993 | Mizuta | 365/189.01 |
| 5,327,497 | 7/1994 | Mooney et al. | 380/25 |
| 5,365,047 | 11/1994 | Yamaguchi | 235/380 |
| 5,473,505 | 12/1995 | Kessoku et al. | 361/684 |
| 5,487,084 | 1/1996 | Lindolm | 375/215 |
| 5,584,043 | 12/1996 | Burkart | 395/882 |

*Primary Examiner*—Ayaz R. Sheikh
*Assistant Examiner*—David A. Wiley
*Attorney, Agent, or Firm*—Ware, Fressola, Van der Sluys & Adolphson LLP

[57] ABSTRACT

The present invention relates to an apparatus for exchanging information between integrated circuit identification cards, also called smart cards, and a terminal device. The circuit solution disclosed herein allows the solution of the problem of interfacing between microprocessor and smart card, in full compliance with international standard ISO7816-3, through the use of low cost components. It uses a bidirectional buffer circuit and a control device so as to control information exchange between the smart card and a terminal device so that the microprocessor handles fast events and the card handles other events.

7 Claims, 5 Drawing Sheets

APPARATUS FOR EXCHANGING INFORMATION BETWEEN INTEGRATED CIRCUIT IDENTIFICATION CARDS AND A TERMINAL DEVICE

TECHNICAL FIELD

The present invention relates to an apparatus for exchanging information between integrated circuit identification cards, also called smart cards, and a terminal device.

BACKGROUND OF THE INVENTION

With these cards a very high number of infomations of the most varied kinds can be stored therein.

Therefore, it is necessary to transfer data contained in the cards through a readout device and devices capable of interpreting the information contained therein.

For handling the transmission, interfacing devices are normally used, which are entirely dedicated to these operations so as to handle the fast events in a suitable manner. These devices, dedicated and very fast, are very expensive.

Microprocessor systems used in normal applications are shared by several devices, distribute their processing capacity among them and therefore they are not able to handle t he fastest events. Hence they have very low intervention speed to be able to realize a correct handling of the fastest events, such as, the handling of the error conditions and the receive/transmit switching of the communication line.

SUMMARY OF THE INVENTION

A first general object of the present invention is to provide an interfacing apparatus for integrated circuit identification cards capable of overcoming the above-mentioned drawbacks.

A more specific object of the present invention is to allow the use of common microprocessor systems so as to reduce the overall costs.

These objects of the present invention are achieved through an apparatus for exchanging information between integrated circuit identification cards and a terminal device forming part of a microprocessor system, said apparatus including a read/write device for said cards, which transmits and receives signals through a bidirectional serial line, said terminal device being connected to said read/write device through said bidirectional serial line, characterized by further comprising a bidirectional buffer circuit provided with at least one enable command, said buffer circuit, disposed between said read/write device and said terminal device, and a control device connected with said bidirectional serial line for outputting a plurality of control commands towards said read/write device and bidirectional buffer circuits so as to control an information exchange between the card and the terminal device so that the processor handles fast events while the card handles other events.

Further characteristics of the invention are set forth in the dependent claims.

The circuit solution as disclosed herein allows the solution of the interfacing problem between microprocessor and smart card, in full compliance with international standard ISO 7816-3 through the use of low cost components.

BRIEF DESCRIPTION OF THE DRAWINGS

The present invention will become more apparent from the following description of a not limiting embodiment thereof taken in conjunction with the attached drawings wherein.

BEST MODE FOR CARRYING OUT THE INVENTION

Figure 1:
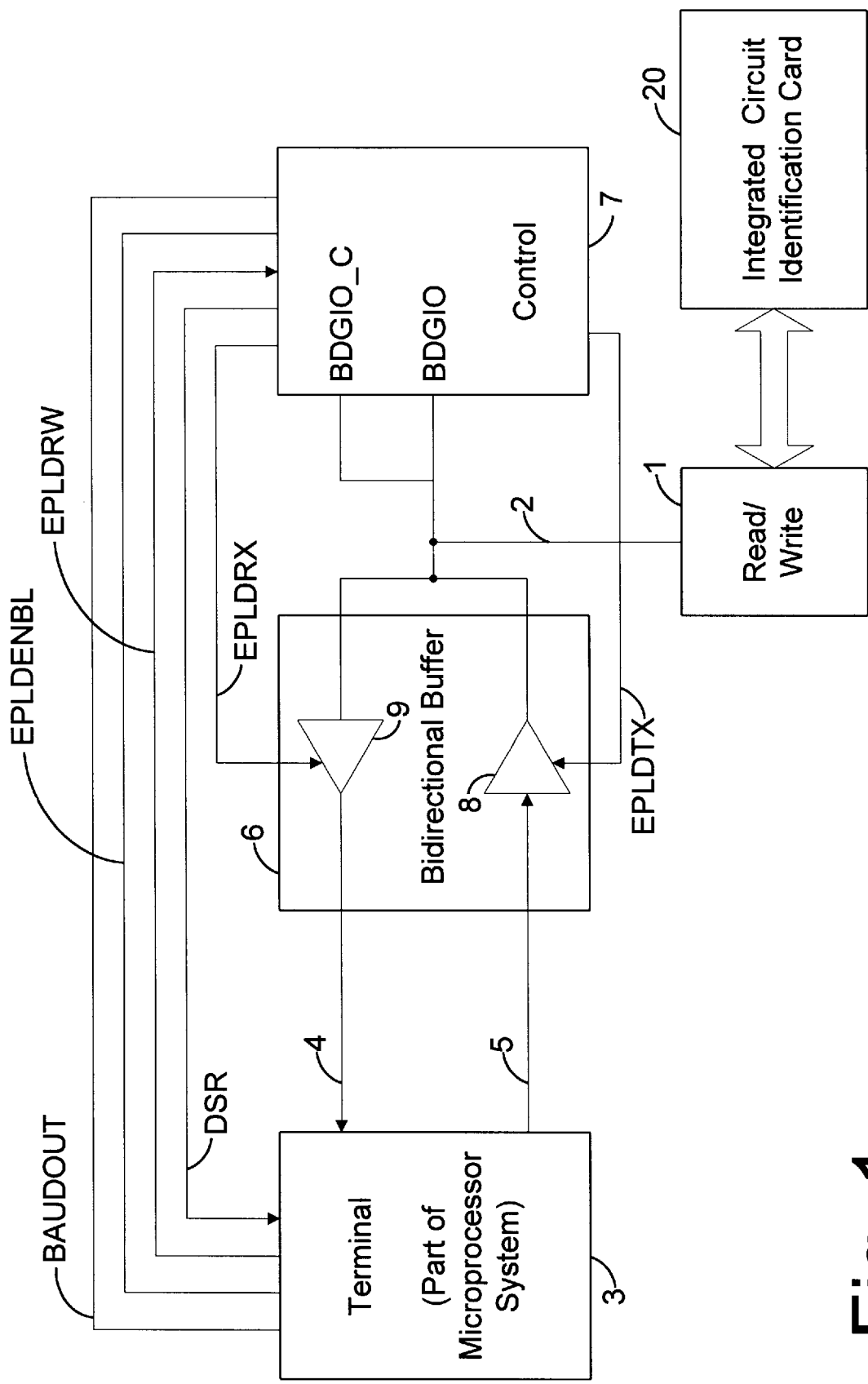
FIG. 1 is a block diagram of the interface apparatus for integrated circuit identification cards in accordance with the invention.

Referring now to FIG.1, a card reading/write device 1 communicates with an intregrated circuit identification card 20 (also known as a smart card), such as by a contact strip on the card, and is connected to a serial line 2, a terminal device 3 forming part of a microprocessor system is connected to unidirectional lines 4 and 5, a bidirectional buffer circuit 6 receiving at one side the serial line 2, feeds on the other side the unidirectional serial lines 4 and 5, a control device 7 connected to bidirectional serial line 2 outputting a plurality of control commands, such as EPLDRX, EPLDTX, DSR,BDGIO-C, to other devices, receives the command EPLDRW and the clock BAUDOUT from the terminal device 3.

According to a preferred embodiment, the use of a transmit buffer 8 and a receive buffer 9, provided with enable commands EPLDTX and EPLDRX, of commercial type 74 HCT126, is required for the bidirectional buffer circuit 6, a terminal device 3 which in the present embodiment is formed by a UART (Universal Asynchronous Receiver and Transmitter) device of commercial type 16C450 and a programmable device EPLD is used for the control device 7.

The dialogue between the card read/write device 1 and the terminal device 3 occurs through the following operations:

connection and activation of the contacts of the read/write device 1, card reset, response to the card reset, information exchange between the card and the terminal device 3, deactivation of the contacts of the read/write device 1.

Let us examine in detail what happens during the step of response to the card reset. In particular, in the case of asynchronous transmission, where the 8-bit characters are transmitted over the serial line in a half-duplex fashion.

A character is formed by 10 bits comprising one start bit, 8 information bits and one bit for parity control.

As a reference for the bit rate over the serial line 2 of the smart card, the ETU (Elementary Time Unit) is represented by the one-bit nominal duration.

The operation of the control device 7 is independent from the transmission baud rate; such device, in fact, receives the signal BAUDOUT of UART (representing a multiple of the baud rate selected by the microprocessor) as a master clock.

The control device 7, configured in reception through the signal EPLDRW, individuates the presence or absence of the parity error and, in the affirmative,it transmits the error signal through the command BDGIO-C (which is normally in the state of high impedance), connected to serial line 2.

At the same time, the control device 7 disables the receive buffer 9 of the bidirectional buffer circuit 6 through the EPLDRX so as to avoid possible frame errors for UART, derived from incorrect reception of the sent-out stop bits.

The control device 7, configured in transmission through the signal EPLDRW, realizes the sampling of the eventual error pulse coming from device 1 and, in the affirmative, sends an interrupt signal DSR to device 3 for the repetition of the last transmitted byte. The guard time is the time interval in which both the control device 7 and the read/write device 1 are in reception (high impedance) in order to be able to transmit the error signalling (by the receiving). In the guard time, the control device 7 disables the transmit buffer 8 through the signal EPLDTX to allow device 1 to signal the eventual parity error.

Normally, the control device 7 is configured in reception. Before executing the transmission of a byte towards the card read/write device 1, device 3 must feed a pulse to pin EPLDRW of the control device 7. The latter automatically switches itself into reception again at the end of the transmitted byte, so as to secure the eventual immediate response of the card (in accordance with times indicated by the ISO7816 standard).

The functions of the external signals (commands) of the control device are listed here below.

BAUDOUT (input). Master clock to the control device. This input must be simply connected to signal BAUDOUT coming out of terminal device 3. It is a digital signal characterized by multiple frequency (nominally 16 times) of the baud rate sent-out by device 3 for communications with the card read/write device 1 and it is used by the control device 7 for sampling the serial line 2 in order to detect the transmission start bit. In this way a sampling period equal to about 0.06 ETU, in compliance with the ISO7816-3 standard that recommends a sampling time less than 0.2 ETU. The BAUDOUT signal is further used for the sampling of information combined in the transmitted byte (8 data bits+1 parity bit). The detection of the start bit is insensitive to start pulses less than 0.5 ETU and therefore it is free from possible noise spikes present on the serial line 2. The control device 7 is activated upon recognition of the start bit, which is decoded after detection of some adjacent positive-going edges of the BAUDOUT signal (after switching serial line 2 to 0-logic level as provided by ISO7816-3 standard), to assure immunity from noise present on the serial line.

DSR (output). Low active interrupt from the control device 7 to the terminal device 3. This digital output shall merely be connected to input DSR of the terminal device 3. The interrupt is activated in case of wrong transmission of a character towards the card read/write device 1 (or in the circumstance in which device 1 receives a character from device 3 and detects a parity error) The interrupt signalling of the control device 7 is an impulsive one. The handling of such interrupt by device 3 implies the retransmission of the last character.

EPLDRX (output). Enable command from the control device 7 to the receive buffer 9 (active high). The activation of this signal allows device 3 to receive the characters present on the serial line 4.

EPLDTX (output). Enable command from the control device 7 to the transmit buffer 8 (active high).

Tha activation of this signal allows device 3 to transmit characters on the serial line 5.

EPLDENBL (input). General reset to the control device 7 (active high). This digital input can merely be connected to a general purpose output of UART (device 3). The activation of the reset signal EPLDENBL inhibits the start bit detection circuit and puts the whole apparatus in reception (signal EPLDRL to 1-logic level and signal EPLDTX to 0-logic level). In general the reset condition, apart from signals BAUDOUT and BDGIO, causes:

| EPLDRX | 1-logic level | |
|--------|--------------|---|
| EPLDTX | 0-logic level | |
| DSR | 1-logic level | |
| BDGIO-C | HZ-logic level | (High-impedance) |

In this way the control device 7 is in a static deactivate condition. As soon as the contact strip of the smart card is activated and before the response to the reset of the latter is started, signal EPLDENBL shall be switched to 0-logic level.

BDGIO-C (output). Error signaling strobe. This output-signal of the control device 7 is to be connected to signal BDGIO and normally it is in a high-impedance condition. It intervenes at 0-logic level to signal the receive error condition (or the case in which a character transmitted by device 1 has been received with parity error). The BDGIO-C signal (when active) is interpreted by device 1 which provides for the repetition of the transmitted character.

EPLDRW (input). Signal for controlling the direction of transmission. Such input, normally at 0-logic level, if stimulated by a pulse, allows the switching of the direction of communication of the serial line 2 and therefore the setup of the interface in transmission towards the device 1. The minimum duration of the pulse is a few nanoseconds. The EPLDRW signal shall be connected to a general purpose output of device 3, bearing in mind that the commutation of the communication direction occurs at one of its positive-going edge. At the end of the transmission character the control device 7 restores the receive condition from the device 1.

For a better understanding of the operation of the apparatus disclosed herein, the following four cases are analyzed:

reception from device 1 without error,
reception from device 1 with error,
transmission to device 1 without error,
transmission to device 1 with error.

The RETURN signal internal to the control device 7 and not shown, represents the restart signal for the whole device and allows the restoration of the receive state from the device 1 after the exchange of a character between the control device 7 and the device 1 has occurred.

Figure 2:
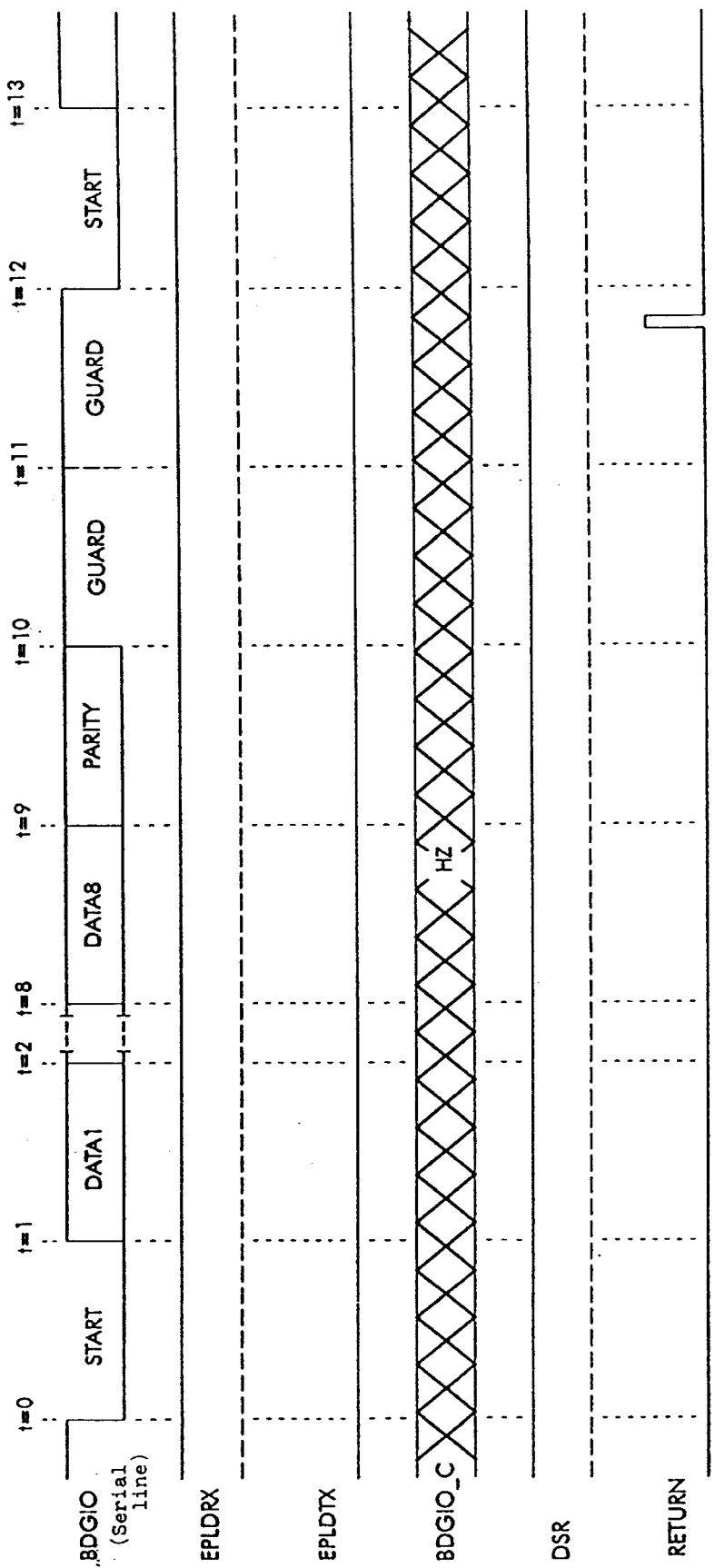
FIG. 2 is a timing diagram relative to receiving from device 1 without error.

Case 1:reception from device 1 without error, referring to FIG.2.

In this case, the absence of parity error is detected by sampling the parity bit at t=9.5 ETU. The most sudden condition, in compliance with ISO7816-3 standard, occurs when the consecutive reception of two characters from device 1, separated by 12 ETU, takes place. For this reason, the RETURN pulse restores the entire control device before t=12 ETU.

Figure 3:
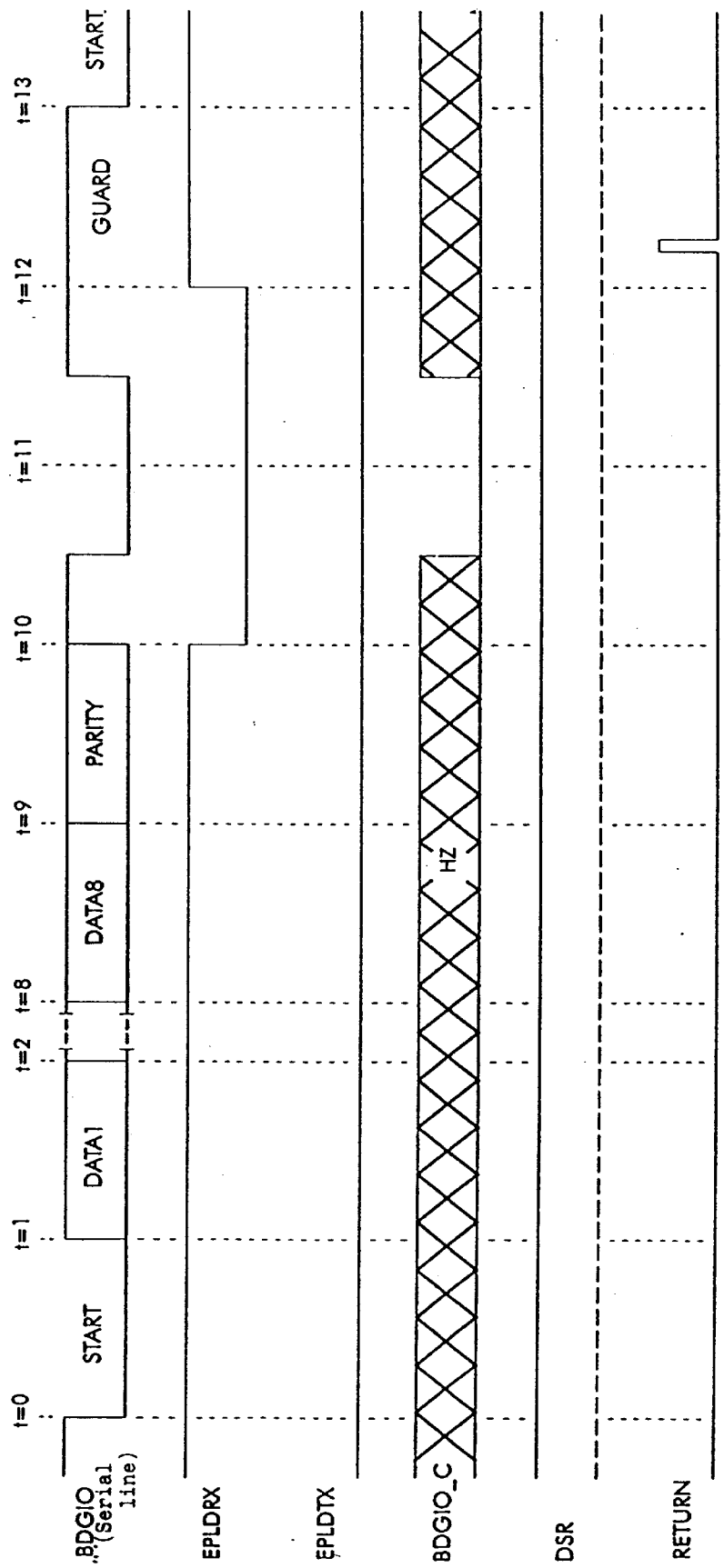
FIG. 3 is the timing diagram relative to receiving from device 1, with error.

Case 2:reception from device 1 with error referring to FIG.3.

In this case the presence of a parity error is detected. The control device 7 signals the necessity of carrying out the repetition of the lost transmitted character by activating the signal BDGIO-C (at low logic level) and disabling, at the same time, the receive buffer 9 so as to avoid possible frame errors to the device 3. The most sudden condition, in accordance with ISO7816-3 standard, occurs when the character is repeated at a distance of 2 ETU from the sampling, by device 1, of the error signal (occuring at t=11 ETU). For this reason, the RETURN pulse occurs before t=13 ETU.

Figure 4:
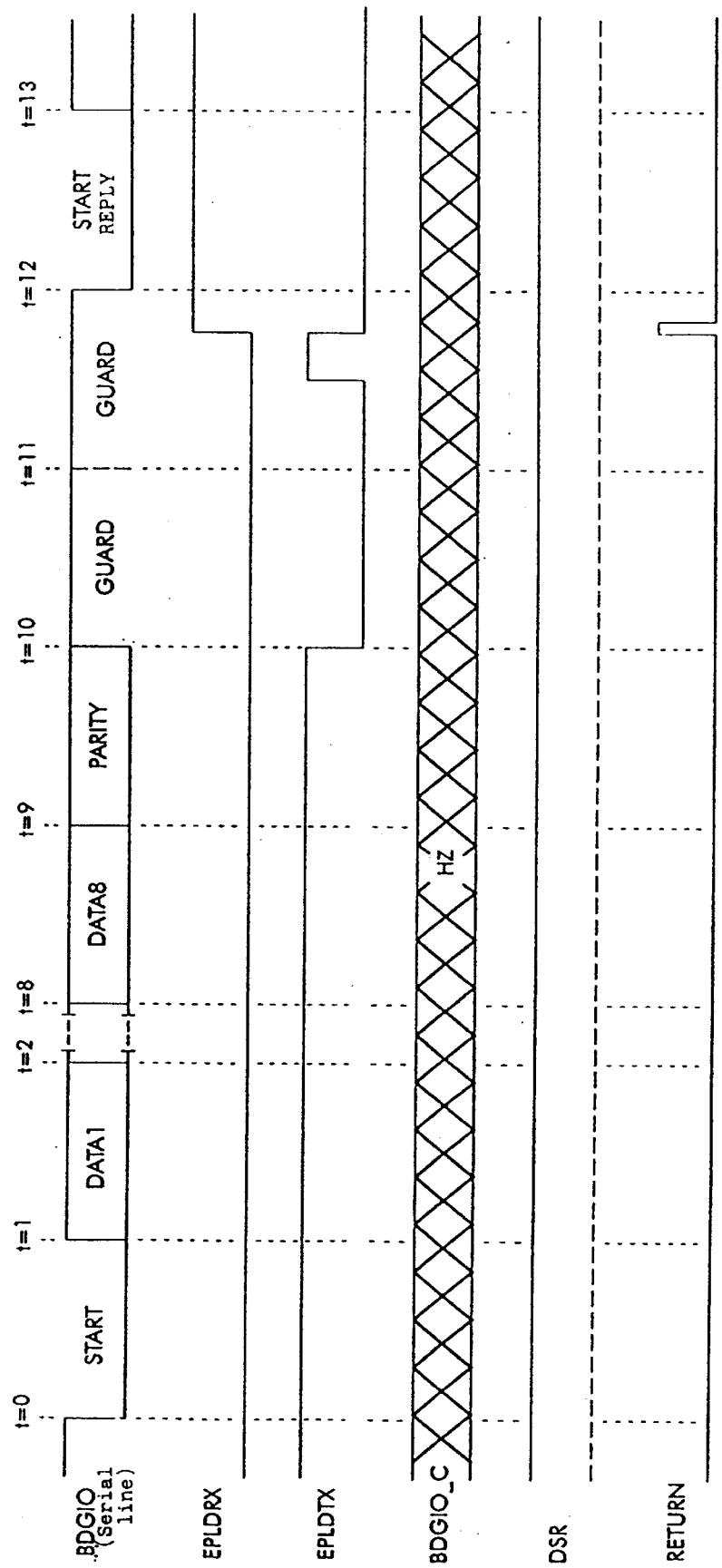
FIG. 4 is the timing diagram relative to transmission to device 1 without error.

Case 3:transmission to device 1 without error referring to FIG.4.

In this case, the control device 7 is switched into transmission through signal EPLDRW. Such device samples the eventual error signal coming from device 1 at t=11 ETU, disabling the transmit buffer at the same time (so as to allow the card to assume eventually the control of the serial line 2). The RETURN pulse restores the control device 7 to reception before the eventual response of device 1.

Figure 5:
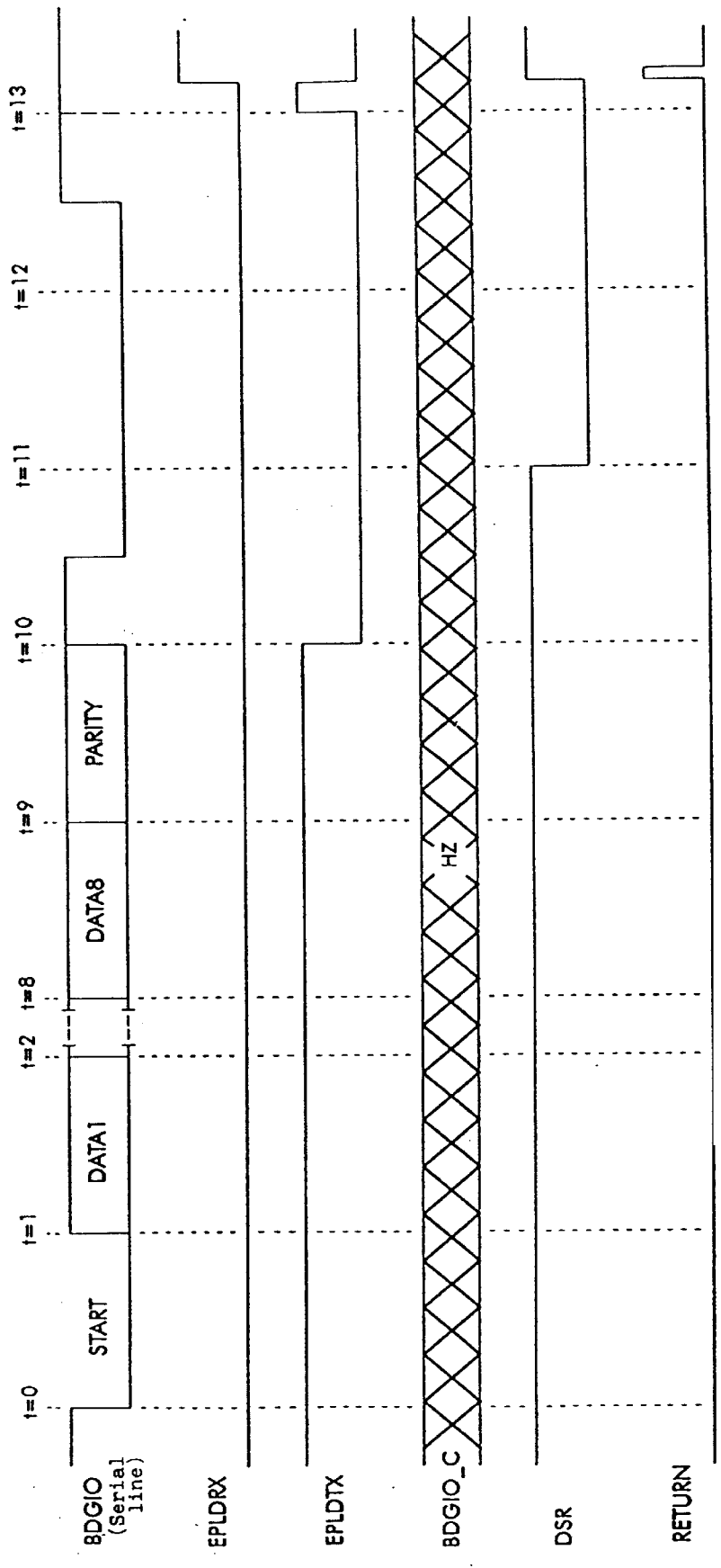
FIG. 5 is the timing diagram relative to transmission to device 1, with error.

Case 4:transmission to device 1 with error referring to FIG.5.

The control device 7 samples the error signal coming from device 1 at t=11 ETU, disabling the transmit buffer 8 for this possible entire duration of such signal.

At the same time, it activates the DSR signal (at low logic level) in order to signal to device 3 the necessity of retransmitting the character.

A person skilled in the art will not encounter any difficulty in realizing such apparatus on the basis of the above description. Therefore, it will not be described in detail being not strictly necessary. Obviously, several parametric and circuital variations all falling within the scope of the present invention are also possible.

What is claimed is:

1. An apparatus for exchanging information between integrated circuit identification cards and a terminal device (3) forming part of a microprocessor system, said apparatus including:

a read/write device (1) for said cards, which transmits and receives signals through a bidirectional serial line (2), said terminal device (3) being connected to said read/write device (1) through said bidirectional serial line (2), a bidirectional buffer circuit (6) provided with at least one enable command, said buffer circuit (6) disposed between said read/write device (1) and said terminal device (3), and a control device (7) connected with said bidirectional serial line (2) for outputting a plurality of control commands towards said read/write device (1), said bidirectional buffer circuits (6) and said terminal device (3), so as to control an information exchange between the card read/write device (1) and the terminal device (3) so that the microprocessor system handles fast events independently of the read/write device (1) handling the card read/write operations, said fast events being capable of being handled faster than the card read/write operations.

2. An apparatus according to claim 1, characterized in that said bidirectional buffer circuit (6) is formed by two unidirectional buffers (8, 9) with corresponding enable commands.

3. An apparatus according to claim 1, characterized in that said plurality of control commands comprises an interrupt command towards said terminal device (3).

4. An apparatus according to claim 1, characterized in that said plurality of control commands comprises an error signalling command towards said read/write device (1) through said serial line (2).

5. An apparatus according to claim 1, characterized in that said plurality of control commands comprises command enabling said bidirectional buffer circuit (6).

6. An apparatus according to claim 1, characterized in that said control device (7) receives at its input a set command of the direction of transmission.

7. An apparatus according to claim 1, characterized in that said control device is synchronized by a clock from said terminal device having a frequency which is greater than the clock used by said terminal device (3).

* * * * *